(12) United States Patent
Mantin

(10) Patent No.: US 11,792,209 B2
(45) Date of Patent: Oct. 17, 2023

(54) ROBUST LEARNING OF WEB TRAFFIC

(71) Applicant: Imperva, Inc., Redwood Shores, CA (US)

(72) Inventor: Itsik Mantin, Shoham (IL)

(73) Assignee: IMPERVA, INC., San Mateo, CA (US)

( * ) Notice: Subject to any disclaimer, the term of this patent is extended or adjusted under 35 U.S.C. 154(b) by 0 days.

(21) Appl. No.: 17/139,644

(22) Filed: Dec. 31, 2020

(65) Prior Publication Data

US 2022/0210166 A1     Jun. 30, 2022

(51) Int. Cl.
*H04L 43/04*     (2022.01)
*H04L 9/40*     (2022.01)

(52) U.S. Cl.
CPC .......... *H04L 63/1408* (2013.01); *H04L 43/04* (2013.01); *H04L 63/0236* (2013.01); *H04L 63/0254* (2013.01)

(58) Field of Classification Search
CPC . H04L 63/1408; H04L 43/04; H04L 63/0236; H04L 63/0254
USPC .......................................................... 726/22
See application file for complete search history.

(56) References Cited

U.S. PATENT DOCUMENTS

| | | | | |
|---|---|---|---|---|
| 7,609,629 B2 * | 10/2009 | Watanabe | ............... | H04L 43/00 370/230 |
| 8,312,543 B1 * | 11/2012 | Gardner | .................. | H04L 67/02 726/22 |
| 10,263,868 B1 * | 4/2019 | Baldi | .................... | H04W 12/02 |
| 2010/0235918 A1 * | 9/2010 | Mizrahi | ................ | H04L 63/168 726/25 |
| 2013/0305357 A1 * | 11/2013 | Ayyagari | ........... | H04B 7/18593 726/22 |
| 2015/0200956 A1 * | 7/2015 | Koide | ................. | H04L 63/1408 726/22 |
| 2019/0044914 A1 * | 2/2019 | Kleiner | ................... | H04L 63/10 |
| 2019/0065784 A1 * | 2/2019 | Margalit | ............. | H04L 63/1416 |
| 2019/0124160 A1 * | 4/2019 | Dhamnani | ........... | G06K 9/6284 |
| 2019/0370856 A1 * | 12/2019 | Cahn | ..................... | H04L 43/062 |
| 2021/0203674 A1 * | 7/2021 | Azaria | ................ | H04L 63/0281 |

* cited by examiner

*Primary Examiner* — Josnel Jeudy
(74) *Attorney, Agent, or Firm* — WOMBLE BOND DICKINSON (US) LLP

(57) ABSTRACT

A method includes monitoring web traffic until a threshold of network traffic is collected. The method further includes determining a number of location characteristics corresponding to the network traffic. The method further includes monitoring traffic information corresponding to the number of location characteristics until a threshold of traffic information is collected. The method further includes determining a number of location content flags corresponding to the traffic information. The method further includes generating, by a processing device, a location profile based on the number of location characteristics and the number of content flags. The method further includes blocking impermissible web traffic from reaching a client device based on the location profile.

20 Claims, 6 Drawing Sheets

ROBUST LEARNING OF WEB TRAFFIC

TECHNICAL FIELD

Aspects of the present disclosure relate to analysis of web traffic and more specifically, to robust learning of web traffic.

BACKGROUND

In computing, web application firewalls are a component to a healthy security position. Traditional security appliances, like firewalls, are not designed to evaluate all of the intricacies of modern applications. Traditional firewalls evaluate network layer information, comparing traffic against a list of criteria. For any public web application, the network firewall will be able to block certain attacks but some attacks that use valid web traffic may be invisible to the network firewall.

Web security models come in negative and positive variants and here the differences are even more important. The positive model has an "allowed list" that specifies what is permitted. Any requests that deviate from the allowed list are blocked. The negative model has a "denied list" that specifies what is not permitted. Any requests that match these signatures are considered "bad" and summarily dropped.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
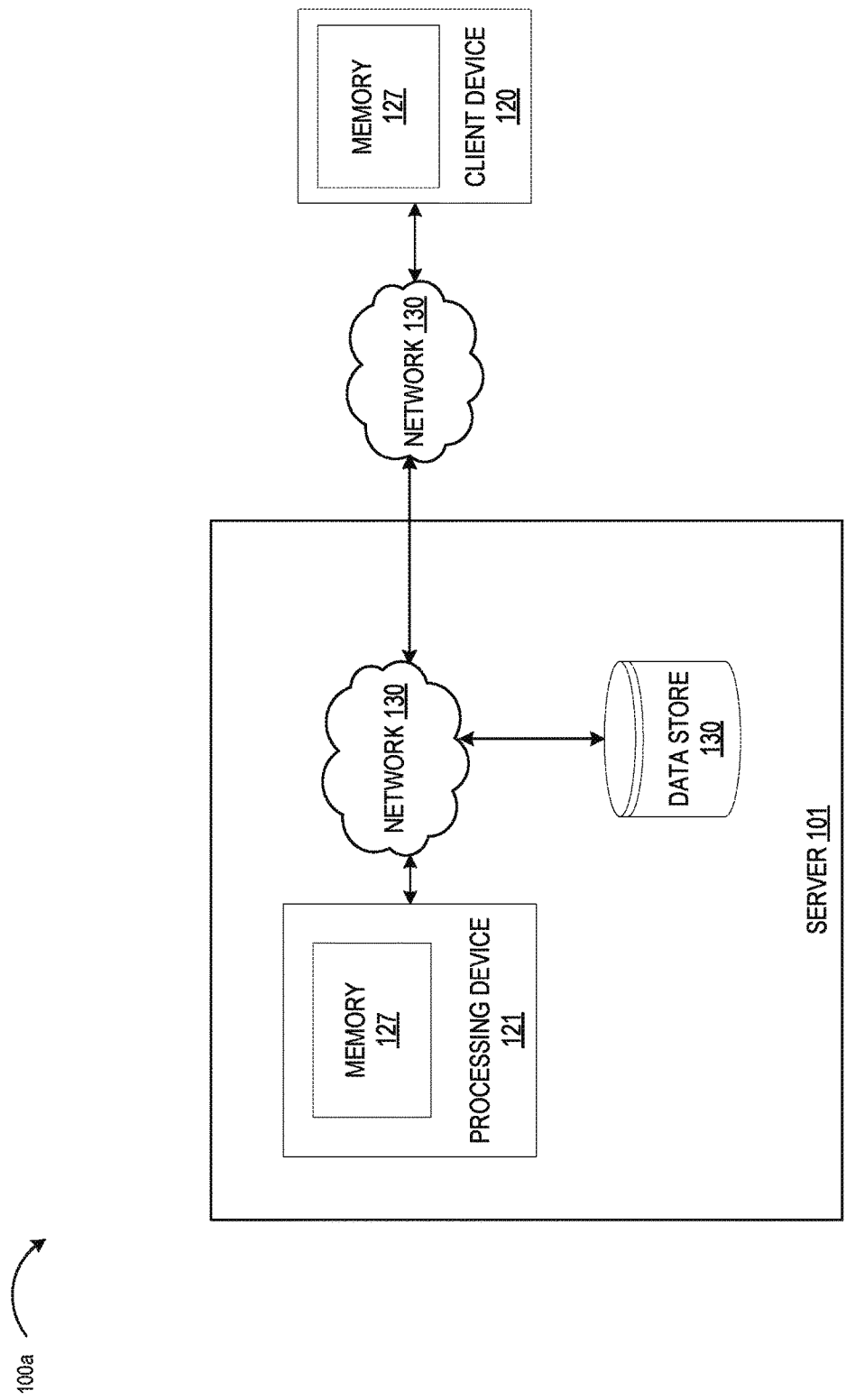
FIG. 1A is a block diagram that illustrates a first example system, in accordance with some embodiments of the present disclosure.

In one embodiment, robust learning of web traffic is described herein to overcome a variety of challenges pertaining to current positive security models. In computing, web security modules (e.g., web application firewalls "WAF", runtime app self-protection "RASP", etc.) are a component to a healthy security position. Traditional security appliances, like firewalls, are not designed to evaluate all of the intricacies of modern applications. Traditional firewalls evaluate network layer information, comparing traffic against a list of criteria. For any public web application, the network firewall may be able to block certain attacks but any attacks that use valid web traffic may be invisible to the network firewall. For example, application layer attacks like SQLi and XSS may be able to pass through the network firewall unchallenged because they may be indistinguishable from normal traffic at the network layer.

Web security models come in negative and positive variants and here the differences are even more important. The positive model has an "allowed list" that specifies what is permitted. Any requests that deviate from the allowed list are blocked. The negative model has a "denied list" that specifies what is not permitted. Any requests that match these signatures are considered "bad" and summarily dropped.

In one embodiment, protection of websites/APIs can be essentially divided into negative security model (aka attack patterns, signatures, policies) and positive security model (aka profile, anomaly detection). In order to implement the second, a web security module (e.g., WAF, RASP, etc.) needs to learn the web traffic. That includes uniform resource locators "URLs", parameters (query-string, body), different attributes of these parameters, among other things. In one example, URL a/b/c carries mandatory querystring "QS" parameters x, y and z. x is of Integer type. y is of String type—however, y sometimes has no value. z is a Boolean value (has True/False) and is Optional in a/b/c.

One of the challenges with this type of learning is the fact that web traffic is also generated by malicious actors, and thus measures need to be taken in order to avoid learning "bad" (e.g., impermissible) characteristics. Advantageously, a straight-forward approach for preventing these is described herein, by enforcing thresholds for different attributes of the traffic. For example, in one embodiment, one might want to allow a String value of x in a/b/c only if "many" requests to a/b/c with String value have been detected, whereas these requests include: >=40 requests; requests from >=10 different IP addresses; requests from >=3 different User-Agent strings; or requests in >=3 disjoint hours (e.g., in the hours 9-10, 14-15 and 15-16).

In one embodiment, this may be referred to as "robust learning" or fault-tolerant learning. Enforcing such thresholds may be easier in batch processing, where the learning algorithm has the entire traffic in hand and can perform "count distinct" operations on the IPs for requests to a/b/c. However, batch processing mandates buffering of traffic along the learning period, which is not always possible. Thus a streaming-friendly solution for fault-tolerant learning is required and provided herein. The technology described is a streaming-friendly technology for fault-tolerant learning of web traffic for the sake of anomaly detection.

FIG. 1A is a block diagram that illustrates a first example system 100a, in accordance with some embodiments of the present disclosure. As discussed herein, memory 127 may include logic and/or applications that enable the operations and systems described herein, when executed. In one embodiment, system 100a may be described as an apparatus, including logic and components for performing the operations described herein (e.g., server 101, network 130, network 120, etc.). In one embodiment, memory 127 resides in whole or in part on a server (e.g., server 101) of system 100a. In another embodiment, memory 127 resides in whole or in part on a client device (e.g., network 120) of system 100a. In yet another embodiment, memory 127 resides in whole or in part on any combination of the two, or in a different system entirely.

Server 101 may include various components, which may allow an application to be accesses and executed from memory 127 on a server device or client device. Each component may perform different functions, operations, actions, processes, methods, etc., for the embodiments described herein and/or may provide different services, functionalities, and/or resources for the embodiments described herein.

As illustrated in FIG. 1A, server 101 includes a memory 127, a computing processing device 121, a data store 115, and a network 130. The memory 127, the processing device 121, and the data store 115 may be coupled to each other (e.g., may be operatively coupled, communicatively coupled, may communicate data/messages with each other) via network 130. Network 130 may be a public network (e.g., the internet), a private network (e.g., a local area network (LAN) or wide area network (WAN)), or a combination thereof. In one embodiment, network 130 may include a wired or a wireless infrastructure, which may be provided by one or more wireless communications systems, such as a Wi-Fi hotspot connected with the network 130 and/or a wireless carrier system that can be implemented using various data processing equipment, communication towers (e.g. cell towers), etc.

The network 130 may carry communications (e.g., data, message, packets, frames, etc.) between the various components of server 101. The data store 115 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to network 120 via a network 130. Network 130 may be a public network (e.g., the internet), a private network (e.g., a local area network (LAN) or wide area network (WAN)), or a combination thereof. In one embodiment, network 130 may include a wired or a wireless infrastructure, which may be provided by one or more wireless communications systems, such as a Wi-Fi hotspot connected with the network 130 and/or a wireless carrier system that can be implemented using various data processing equipment, communication towers (e.g. cell towers), etc. The network 130 may carry communications (e.g., data, message, packets, frames, etc.) between the various components of system 101. Network 120 may include memory 127, in addition to, or alternatively from, server 101. Further implementation details of the operations performed by system 101 are described with respect to FIGS. 1B-4.

Figure 1B:
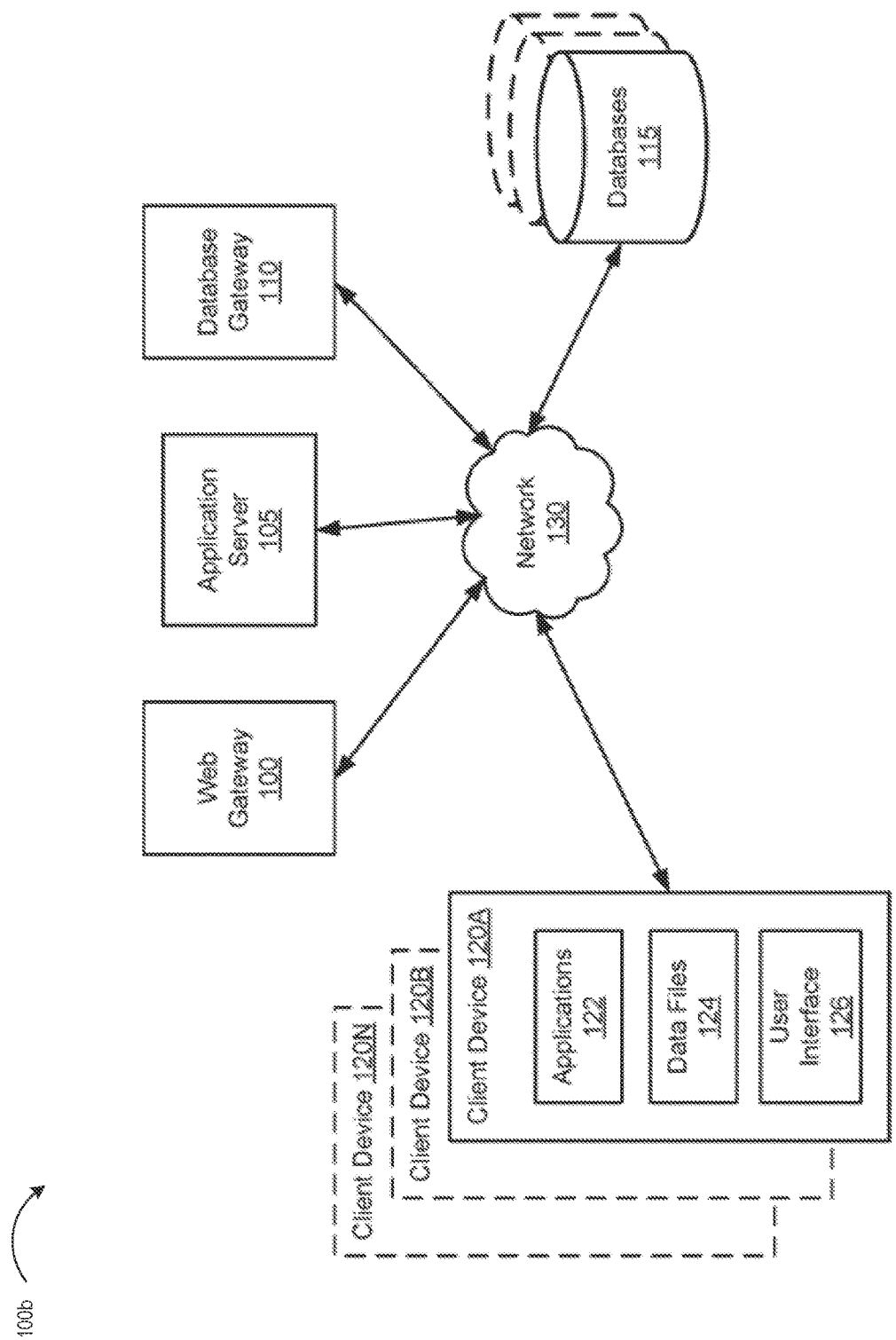
FIG. 1B is a block diagram that illustrates a second example system, in accordance with some embodiments of the present disclosure.

FIG. 1B is a block diagram that illustrates a second example system, in accordance with some embodiments of the present disclosure. The system environment includes a web gateway 100, application server 105, database gateway 110, one or more databases 115, and one or more client devices 120 (e.g., client devices 120A, 120B . . . 120N) connected over a network 130. In alternative configurations, different and/or additional components may be included in the system environment. For example, although one web gateway 100, application server 105, and database gateway 110 are shown in FIG. 1B, in other embodiments, the system environment may include any number of application servers 105 protected by different instances of web gateways 100 and database gateways 110.

Embodiments may be used in conjunction with databases implemented according one or more different database models (e.g., those previously described), the parts of which are generically referred to using the above described terms "database structures." each comprising "records" comprised of "cells" that each store a data object. However, by way of example, embodiments will be described with reference to relational databases, where each relational database includes database tables (as its database structures) logically arranged as columns and rows (as it records), the intersection of which are cells each storing a data object.

The client devices 120 are one or more computing devices capable of receiving user or non-user input as well as transmitting or receiving data via the network 130. A client device 120 may be an electronic device such as a smartphone, tablet computer, desktop computer, laptop computer, or another suitable type of device that can access content or services provided by an application server 105 or database 115. The client device 120 may include any number of applications 122 such as web browser(s) and other client applications. In addition, the client device 120 can transmit a request (e.g., an HTML request) for data to an application server 105 (more specifically, a web application being executed on the application server 105), which may be associated with a certain application 122. The client device 120 can execute applications 122 to create, delete, view, or edit data files 124. The client device 120 can present information via a user interface 126, for instance, the client device 120 may render web application data received from the application server 105 using a web browser.

The application server 105 includes server hardware. In one embodiment, the application server 105 executes web application(s) to generate content, e.g., in Hypertext Markup Language (HTML) or another suitable language, responsive to requests sent by the client device 120. The web application(s) being executed by the application server 105 may send queries. e.g., a Structured Query Language (SQL) query, for data from a database 115. Additionally, the web application(s) being executed by the application server 105 can generate content using the data from the database 115 and/or provide the data to the client device 120. For example, the client device 120 executing a browser can transmit a request (also sometime referred to as a "request for data;" e.g., an HTML request) to a web application being executed on the application server 105, in response, the web application may submit one or more queries (e.g., SQL queries) to and receive data (also referred to as the "requested data" or "query results") back from the one or more databases 115; and this requested data may be included in or be used to generated a response (which contents is also referred to a "response data") sent back to the client device 120 by the web application. The request for data and the response data is visible to the WAF implemented as the web gateway 100, and the one or more queries and the requested data is visible to the database activity monitoring "DAM" implemented as the database gateway 110.

The database gateway 110 monitors data access to one or more databases 115. The database gateway 110 can parse requests (queries) and/or responses (query results) of a database 115 and identify data that leaves the database 115. In an embodiment, the database gateway 110 identifies data using metadata of the database 115 or information associated with a query. For instance, the database gateway 110 may use metadata including attributes of a database table (in which requested data resides) such as a name of a column or the database table (sometimes referred to as a data table) found in a query.

Additionally, or alternatively, a regular expression may be used to parse information from a database table (i.e., parsing the query result) Example information associated with the query may include a format of the requested data or a user-specified sensitive data parameter. The phrase "metadata of the requested data" refers to metadata associated in some way with the requested data, such as: 1) metadata that is stored in the database, that describes database structures from which the requested data was accessed, and that is found in the query (e.g., database table name, column name, etc.); 2) metadata that is stored in the database, that describes database structures from which the requested data was accessed, and that is not found in the query (e.g., a column descriptor, etc.); 3) metadata that may or may not be stored in the database, but is associated in some way with the requested data (e.g., metadata describing the requested data that was input from an offline manual/automated classification of data in tables and columns) and/or with the query.

In some embodiments, the database gateway 110 performs security operations (also referred to as "data protection operations") (e.g., generating an alert, blocking, masking, sending data information to the web gateway, etc.) responsive to monitoring traffic being communicated with a database 115. In particular, the database gateway 110 may detect data objects queried (query analysis) or output (query result analysis) from the database 115 to other components of the system such as application servers 105. Furthermore, the database gateway 110 may track actions such as a number or type of requests transmitted to the database 115 as well as determine trends associated with tracked actions. In addition to sending data information, the database gateway 110 may also send other information to a web gateway 100 such as tracked actions, alerts, or information describing new or updated security policies, among other types of information for protection of a database 115.

In one embodiment, the WAF is implemented as the web gateway 100 to protect sensitive data from application servers 105 and/or databases 115. The web gateway 100 serves as an interface between the client devices 120 and application servers 105. Thus, the WAF is aware of users, client devices, web applications, application servers, and requests/responses between them; and thus, can generate a map representing one or more aspects of this. In an embodiment, responsive to receiving requests from a client device 120 for data from a database 115, the web gateway 100 routes the requests to the appropriate application server 105 and receives response data in response to the requests.

The web gateway 100 may determine whether to provide response data to client devices 120 or perform some form of security operations (also referred to as "data protection operations") (e.g., block or protect response data from being received by client devices 120, flag the identified data for review by personnel associated with the web gateway). For example, in response to determining that a request originated from a potentially malicious client device 120, the web gateway 100, using the data information provided by the database gateway 110, can detect transmission of data from a database 115 through a web application to the client device 120; and: 1) combine this with information from or add it as supplemental information to the above identified map, thereby allowing the web gateway to know which user accessed which data items, when, from where and how many (this is sometime referred to as a data audit); and/or 2) prevent or limit the transmission of the data. A malicious client device 120 may attempt to attack or expose a vulnerability of the network infrastructure using a SQL injection or another type of attack or request. The web gateway 100 in conjunction with the database gateway 110 can block or mitigate events associated with an undesirable effect on the system caused by client devices 120.

As described above, the web gateway 100 can use the data information received from the database gateway 110 to identify data in responses from web applications. The web gateway 100 may store data information in memory or cache and retrieve the sensitive data information for later use, for example, when a subsequent request is received from a client device 120. Additionally, the web gateway 100 may track activity of users of client devices such as previous requests for data from a database 115 and/or application server 105.

The web gateway 100 may perform one or more types of security/data protection operations to protect identified data. In an embodiment, the web gateway 100 logs accesses to data from databases 115 and information describing users or client devices 120 that accessed the data, e.g., indicating an Internet Protocol (IP) address, or anonymous source such as a Tor network, of a requesting client device 120, whether the client device 120 is associated with a human user or a bot that provides automated requests, a geographical location of client device 120, or hypertext transport protocol (HTTP) session information, among other types of information. Based on data access logs, the web gateway 100 may generate an alert or enforce a policy responsive to determining that a criterion associated with the alert or policy, respectively, has been satisfied. It should be noted that the security/data protection operations performed by the web gateway 100 may be configured by an entity associated with the web gateway (such as a security engineer or network administrator). In such embodiments, the entity associated with the web gateway 100 can specify an operation to perform for one or more types of identified data. For example, the web gateway 100 can be configured to provide data to a requesting client device and send an alert to a security engineer whenever a phone number is detected within the data, and to encode data before providing to a requesting client device when a social security number is detected within the data.

A criterion associated with an alert or policy (e.g., a location policy, as described herein) may indicate a threshold access rate, e.g., a threshold number of accesses to a database 115 (or for a certain type of data) within a predetermined time frame. The criterion may also specify a type of user associated with the threshold access rate such as an administrator or automated bot of a client device 120. The web gateway 100 may enforce a policy by blocking a client device 120 from providing additional requests for data access or receiving further data from a database 115, e.g., until the criterion has been reset. In some embodiments, criteria for enforcing a blocking policy may be associated with a greater threshold access rate than that of another criterion for triggering an alert. As an example, criteria may be used to restrict access of a particular type of user (e.g., an automated bot or unknown device type) to a certain type of data (e.g., social security numbers). The web gateway 100 can also use criteria to limit data access requests from potentially suspicious IP addresses. In some use cases, the web gateway 100 performs security/data protection operations based on a risk level of a login associated with a user session of a client device 120. The risk level may correspond to a predicted likelihood that a request or client device 120 is malicious.

In some embodiments, the web gateway 100 performs security/data protection operations in an "inline mode." During inline mode, the web gateway 100 can monitor and block data transmission in real time. The web gateway 100 may perform other operations such as data encryption using a cryptographic key, anonymizing or obfuscating sensitive data, or applying a cryptographic hash function. In other embodiments, the web gateway 100 may perform security/data protection operations in a "sniffing mode." During sniffing mode, the web gateway 100 can perform an audit on data access logs or other aggregated information describing requests and response data provided to client devices 120 in sniffing mode, the web gateway 100 does not perform security/data protection operations in real-time such as blocking sensitive data before responses are sent to client devices 120.

The web gateway 100 may run a behavioral analysis (e.g., offline) of data access information to trigger alerts or enforcement of policies. In some use cases, the web gateway 100 uses machine learning algorithms or a trained machine learning model to detect anomalies in data access information. For instance, the web gateway 100 determines if a specific user or client device 120 is providing a number of requests greater than an expected threshold or requesting data during unexpected periods of time.

The network 130 may comprise any combination of local area and/or wide area networks, using both wired and/or wireless communication systems. In one embodiment, the network 130 uses standard communications technologies and/or protocols, e.g., Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), HTTP, simple mail transfer protocol (SMTP), and file transfer protocol (FTP). Data exchanged over the network 130 may be represented using any suitable format, such as (HTML) or extensible markup language (XML). In some embodiments, all or some of the communication links of the network 130 may be encrypted using any suitable technique or techniques.

The components shown in FIG. 1B may include a processor for manipulating and processing data, and a storage medium for storing data. The storage medium may include both volatile memory (e.g., random access memory) and non-volatile storage memory such as hard disks, flash memory, and external memory storage devices. In various embodiments, the storage medium comprises a non-transitory computer-readable storage medium. Various executable programs are each embodied as computer-executable instructions stored to the non-transitory computer-readable storage medium. The instructions when executed by the processor cause the corresponding component (e.g., web gateway 100 or database gateway 110) to perform the functions attributed to the programs described herein. In various embodiments, the web gateway 100, database gateway 110, and application server 105 may comprise distinct, different computing devices. The web gateway 100 and the database gateway 110 may be associated with a same entity, e.g., a provider of a security system or web application firewall. The application server 105 or databases 115 may be associated with a third party. Furthermore, the web gateway 100, database gateway 110, application server 105, client devices 120, or databases 115 may be located in different geographical locations, e.g., at a client site or data center.

Figure 1C:
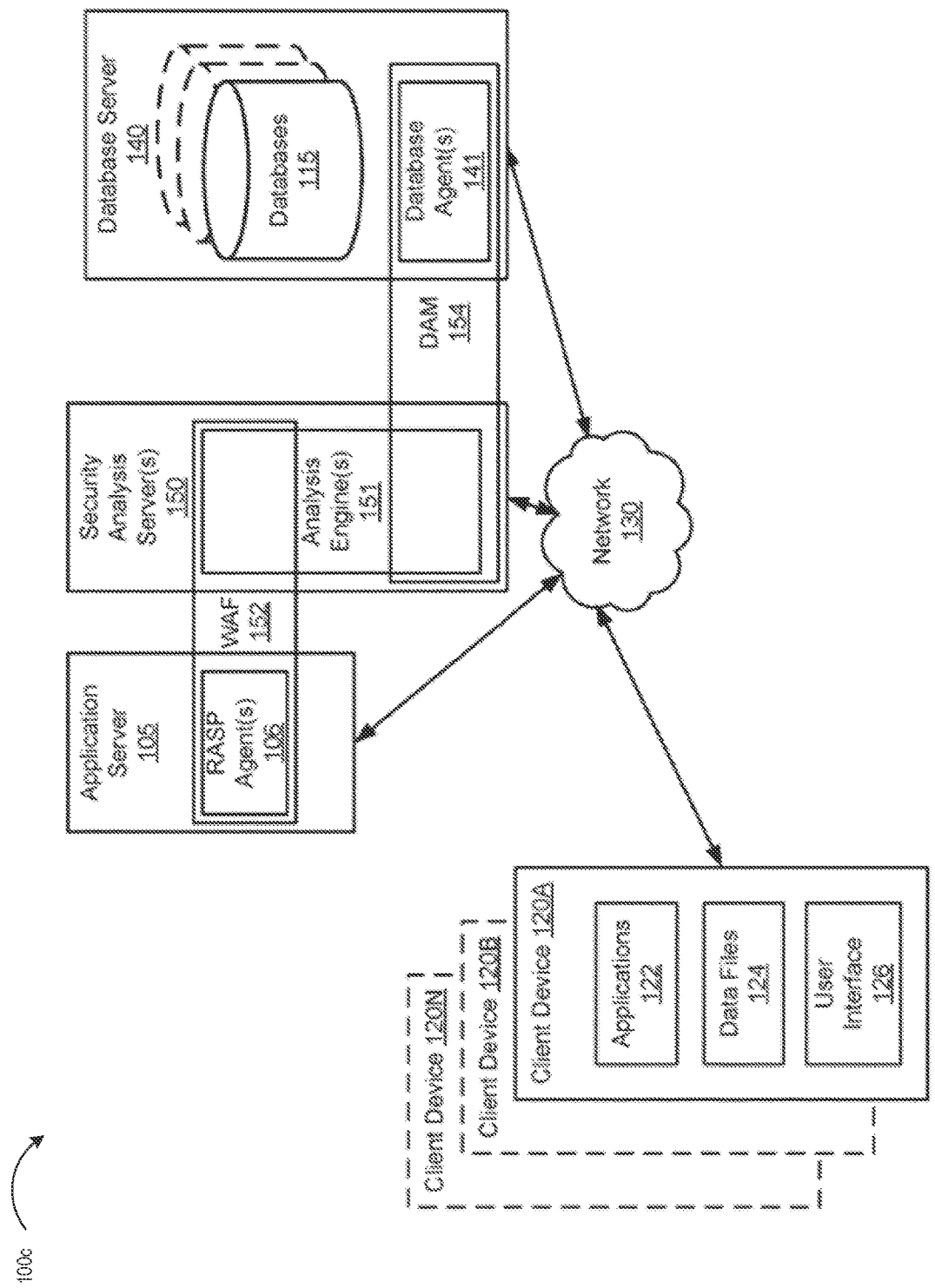
FIG. 1C is a block diagram that illustrates a third example system, in accordance with some embodiments of the present disclosure.

FIG. 1C is a block diagram that illustrates a third example system, in accordance with some embodiments of the present disclosure. FIG. 1C includes the client device 120, network 130, application server 105, and databases 140 from FIG. 1C. In addition, FIG. 1C shows: 1) Runtime Application Self-Protection (RASP) agent(s) 106 that are part of the runtime executing the web application(s) on the application server 105 and that are communicating with one or more of analysis engine(s) 151 executing on analysis server(s) 150 to implement a WAF 152; and 2) the database(s) 141 are hosted on a database server 140 that is also executing database agent(s) 141 that are communicating with one or more of analysis engine(s) 151 executing on analysis server(s) 150 to implement the DAM 154. While FIG. 1C shows a WAF and DAM implemented by a web gateway 100 and a database gateway, FIG. 1C shows a WAF and DAM implemented with RASP agent(s) 106, database agent(s) 141, and analysis engine(s) 151.

While in some embodiments the application server 105, database server 140, and security analysis server(s) 150 in FIG. 1C represent separate server hardware, in other embodiments one or more of these may share server hardware. In some embodiments, there are separate analysis engines implemented by separate analysis servers to provide the WAF 152 and the DAM 154, and the analysis engine implementing the DAM 154 sends the sensitive data information to the analysis engine implementing the WAF 152 on the separate analysis server. However, other embodiments do not have this level of separation (e.g., there are separate analysis engines to provide the WAF 152 and the DAM 154, but they are being implemented by a single security server 150 (the same server hardware); there is a single analysis engine implemented by a single security server 150 to provide both the WAF 152 and the DAM 154).

Thus, a WAF may be implemented as a single unit, or may comprise multiple units such as an analysis server coupled in communication with one of more agents that are each part of a runtime environment (e.g., as a RASP) executing a web application. Such a single unit and/or such an analysis server may be implemented in a standalone electronic device (typically on premises), in a virtual appliance (on premises or in the cloud) executed by server hardware, and/or as a SaaS in the cloud (which service is provided by software being executed by server hardware in the cloud); while such agents may be part of a runtime environment (e.g., as a RASP) executing on server hardware to execute a web application server. Also, a WAF may be inline or a sniffer (out of band).

Similarly, a DAM may be implemented as a single unit, or may comprise multiple units such as an analysis server coupled in communication with one of more database agents that are each executing on a database server. Such a single unit and/or such an analysis server may be implemented in a standalone electronic device (typically on premises), in a virtual appliance (on premises or in the cloud) executed by server hardware, and/or as a SaaS in the cloud (which service is provided by software being executed by server hardware in the cloud); while such database agents may be executing with a database server on server hardware. Also, a DAM may be inline or a sniffer (out of band). In one embodiment, as a result of the data information (e.g., location information, as described herein) being provided by the DAM (e.g., database gateway 110 or DAM 154) to the WAF (e.g., web gateway 100 or WAF 152), this system can detect in the WAF (e.g., web gateway 100 or WAF 152) unauthorized access to data from the database(s) 115 and attribute the access to a particular user.

Figure 2:
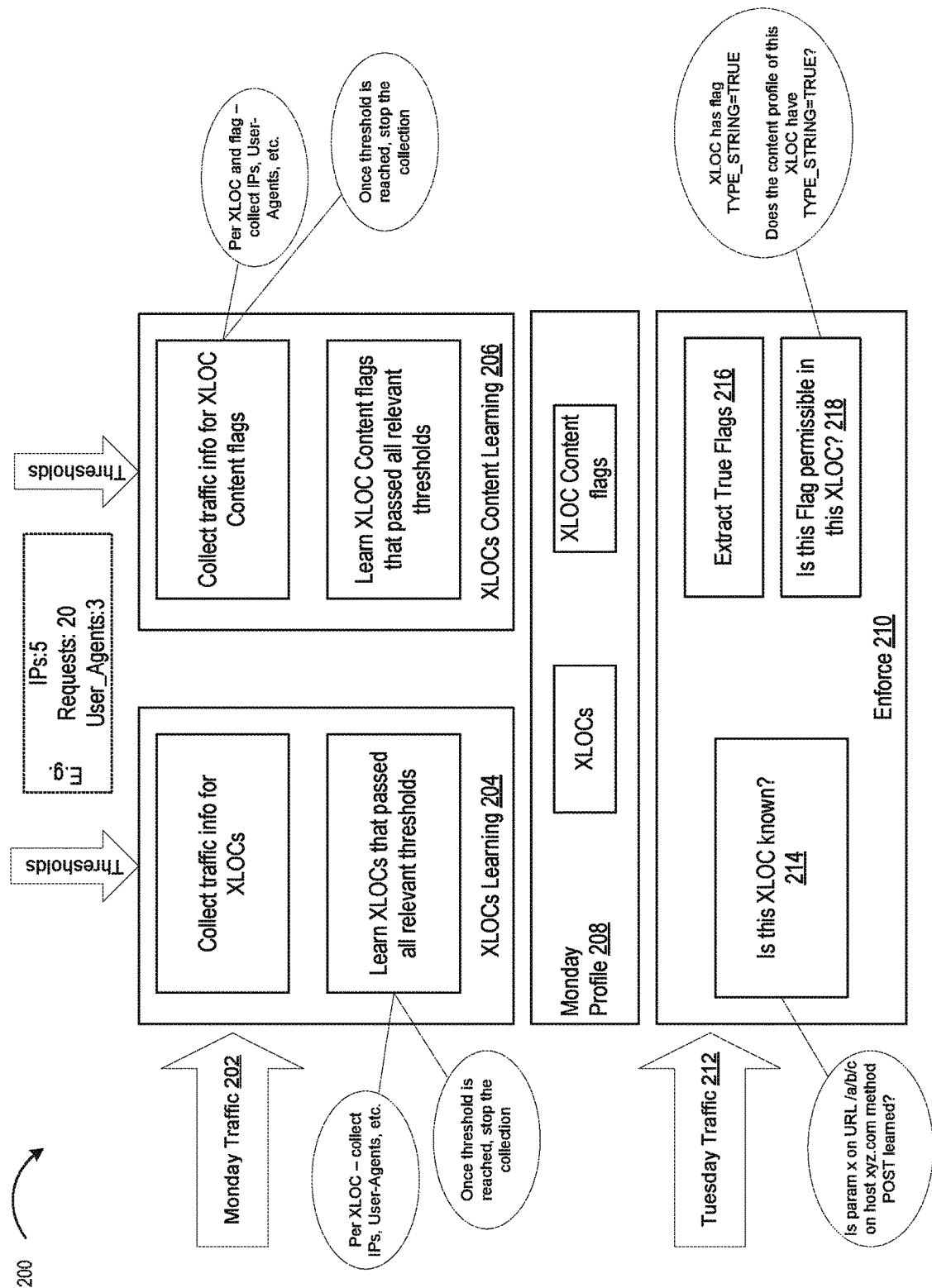
FIG. 2 is a first flow diagram of a first method of robust learning of web traffic, in accordance with some embodiments of the present disclosure.

FIG. 2 is a first flow diagram of a first method 200 of robust learning of web traffic, in accordance with some embodiments of the present disclosure. The method 200 may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of FIG. 1A-C may perform one or more of the following operations. For example, in one embodiment, processing logic of processing device 121 performs the following operations, with respect to the individual components of FIG. 1A-C. In another embodiment, any other suitable processing device may perform the described operations.

Referring to FIG. 2, the technology described herein is based on the following two components: XLOCs (e.g., locations) and content profiles. In one embodiment an XLOC is a "location" (e.g., any parameter or characteristic) of the website/API. In a variety of embodiments, a location may be a host, URL, method, query-string-parameter, body-parameter, cookie, etc. E.g., www.imperva.com+a/b/c+POST→x. Locations may be identified as portions, parameters, or characteristics of an endpoint identifier, such as a URL. In one embodiment, a parameter may "belong" to a host (aka global parameter)–Host+URL+Method (parameter specific to this URL) or other combinations of Host/URL/Method.

Furthermore, a content profile may be a profile for the content of an XLOC, which: 1) describes or identifies the "normal" content of this xloc in legitimate web/API traffic; and 2) facilitates anomaly detection when observing traffic that has content for this xloc that exceeds the profile.

Referring again to FIG. 2, web traffic 202 may first be monitored in real time in an xloc learning stage 204. During this stage, processing logic may collect traffic information from the web traffic until a predetermined traffic threshold is reached. In one embodiment, processing logic may determine and/or classify any xlocs that pass relevant thresholds. In one embodiment, thresholds may be based on a number of requests, a number of requesting IPs, a time period, etc. Once complete, processing logic may enter an xloc content learning state 206. During this stage, processing logic may collect traffic information related to the learned xlocs from 204, to determine content flags that pass relevant thresholds. During this state, permissible values and characteristics, represented as flags, are determined for the xlocs previously determined. Once again, monitoring and collecting during this state may be complete when one or more threshold is reached. For example, during this stage it may be determined that permissible content associated with a "String" location is less than two characters long. As such, flags may be created for one and two-character string locations, which identify the content as permissible. Any strings having more than two strings may be determined to be impermissible, either based on the lack of a permissible flag, or an explicit recitation of an impermissible flag.

Based on the xlocs and content flags determined by processing logic, a location profile 208 may be created, which contains the xlocs, corresponding flags, and/or specific rulesets that govern the operations of such. In one embodiment, processing logic in an enforcement stage 210 may use the location profile 208 to allow or deny web traffic requests for future web traffic 212. For example, for any incoming request, processing logic may determine if one or more included xlocs are recognized 214, and if so, relevant flags may be determined 216 from the location profile 208. Once determined, processing logic may then determine of the content of the xloc determined at 214 is flagged as permissible 218. If so, the request may be completed. If not, the request may be denied. In one embayment, the data described herein, including the location profile, may be stored in databases 115 of FIG. 1A-C, for example.

Figure 3:
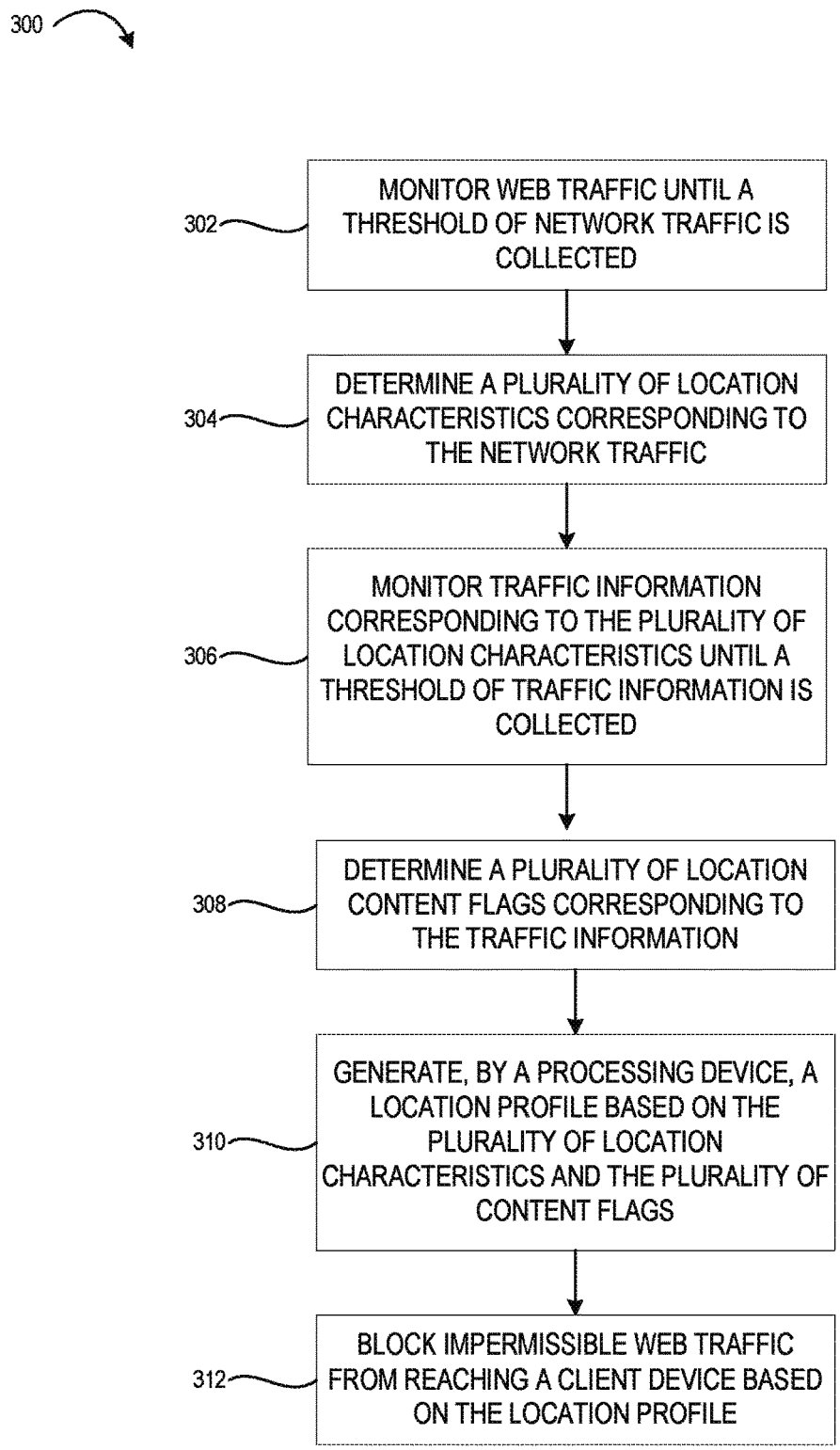
FIG. 3 is a second flow diagram of a second method of robust learning of web traffic, in accordance with some embodiments of the present disclosure.

FIG. 3 is a second flow diagram of a second method 300 of robust learning of web traffic, in accordance with some embodiments of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of FIG. 1A-C may perform one or more of the following operations. For example, in one embodiment, processing logic of processing device 121 performs the following operations, with respect to the individual components of FIG. 1A-C. In another embodiment, any other suitable processing device may perform the described operations.

Referring to FIG. 3, at block 302, processing logic may monitor web traffic until a threshold of network traffic is collected. In one embodiment, such a threshold may correspond to a predetermined a number of network requests to at least one of: different internet protocol (IP) addresses, different user-agent settings, or a time period. At block 304, processing logic may determine a plurality of location characteristics (e.g., xlocs, or locations, as described herein) corresponding to the network traffic. In one embodiment, the location characteristics of a website or application programming interface (API) include an identification of at least one of a: host, uniform resource locator (URL), method, query string parameter, body parameter, or cookie.

At block 306, processing logic may monitor traffic information corresponding to the plurality of location characteristics (e.g., while analyzing content of the previously identified location characteristics) until a threshold of traffic information is collected. In one embodiment, the threshold of traffic information corresponds to a predetermined a number of network requests comprising a specific location characteristic, for example. At block 308, processing logic may then determine a plurality of location content flags corresponding to the traffic information. As described herein, flags may indicate that a specific content relative to a specific location characteristic is permissible or impermissible. As such, in one embodiment, the location profile identifies a plurality of location characteristics and corresponding allowable content.

At block 310, processing logic may generate, by a processing device, a location profile based on the plurality of location characteristics and the plurality of content flags. In one embodiment, the location profile includes locations (location characteristics) and corresponding flags, as well as any optional additional rules that may govern the two. At block 312, processing logic may block impermissible web traffic from reaching a client device based on the location profile. For example, in one embodiment, processing logic may determine that the impermissible web traffic comprises a known location characteristic (xloc) in the location profile, determine a flag of the known location characteristic, and determine that the flag indicates that the content of the location characteristic is impermissible according to the location profile.

Alternatively, processing logic may determine that permissible web traffic comprises a known location characteristic in the location profile, determining a flag of the known location characteristic, determining that the flag indicates that the content of the location characteristic is permissible according to the location profile, and allow the permissible web traffic to reach the client device in response to determining the permissibility.

Figure 4:
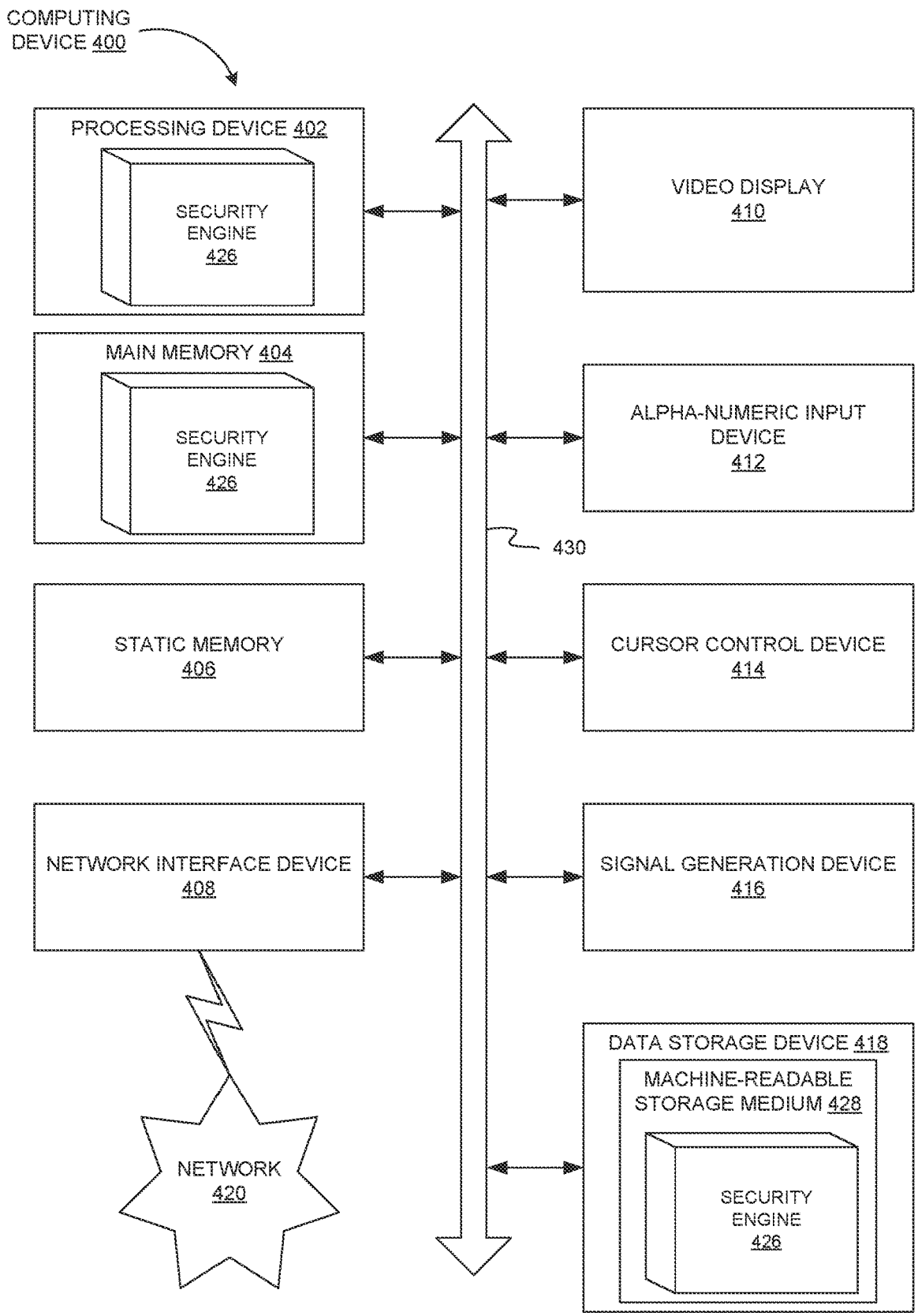
FIG. 4 is a block diagram of an example computing device that may perform one or more of the operations described herein, in accordance with some embodiments of the present disclosure.

FIG. 4 is a block diagram of an example computing device 400 that may perform one or more of the operations described herein, in accordance with some embodiments of the present disclosure. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein. In one embodiment, processing device 402 represents processing device 121 of FIG. 1A. In another embodiment, processing device 402 represents a processing device of a client device (e.g., network 120 of FIG. 1A).

Computing device 400 may further include a network interface device 408 which may communicate with a network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions, e.g., instructions for carrying out the operations described herein, in accordance with one or more aspects of the present disclosure. Instructions implementing security engine 426 may also reside, completely or at least partially, within main memory 404 and/or within processing device 402 during execution thereof by computing device 400, main memory 404 and processing device 402 also constituting computer-readable media. The instructions may further be transmitted or received over a network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    monitoring web traffic until a threshold of network traffic is collected;
    determining a plurality of location characteristics corresponding to the network traffic, wherein each of the plurality of location characteristics corresponds to a parameter or characteristic of a website or application program interface (API) that the network traffic is associated with, and wherein the threshold of network traffic corresponds to a predetermined number of different internet protocol addresses associated with network requests of the network traffic, a predetermined number of different user-agent strings associated with network requests of the network traffic, and network requests in a predetermined number of time periods;
    monitoring traffic information corresponding to the plurality of location characteristics until a threshold of traffic information is collected for each of the plurality of location characteristics;
    determining a plurality of location content flags corresponding to the traffic information;
    generating, by a processing device, a location profile that denies incoming web traffic above a security threshold from reaching a client device, the location profile based on the plurality of location characteristics and the plurality of content flags; and
    blocking the incoming web traffic from reaching the client device based on the location profile when the incoming web traffic corresponds to impermissible web traffic.

2. The method of claim 1, wherein blocking the impermissible web traffic comprises:
    determining that the impermissible web traffic comprises a known location characteristic in the location profile;
    determining a flag of the known location characteristic; and
    determining that the flag indicates that a content of the known location characteristic is impermissible according to the location profile.

3. The method of claim 1, further comprising:
    determining that permissible web traffic comprises a known location characteristic in the location profile;
    determining a flag of the known location characteristic;
    determining that the flag indicates that a content of the known location characteristic is permissible according to the location profile;
    allowing the permissible web traffic to reach the client device in response to determining that the flag is permissible.

4. The method of claim 1, wherein the threshold of network traffic corresponds to a predetermined number of total network requests received.

5. The method of claim 1, wherein the threshold of traffic information corresponds to a predetermined number of network requests comprising a specific location characteristic.

6. The method of claim 1, wherein each of the plurality of location characteristics comprises an identification of at least one of a: host, uniform resource locator (URL), method, query string parameter, body parameter, or cookie of the website or the application program interface (API) that the network traffic is associated with.

7. The method of claim 1, wherein the location profile identifies a plurality of location characteristics and corresponding allowable content.

8. A system, comprising:
a memory to store a location profile; and
a processing device operatively coupled to the memory, the processing device to:
monitor web traffic until a threshold of network traffic is collected;
determine a plurality of location characteristics corresponding to the network traffic, wherein each of the plurality of location characteristics corresponds to a parameter or characteristic of a website or application program interface (API) that the network traffic is associated with, and wherein the threshold of network traffic corresponds to a predetermined number of different internet protocol addresses associated with network requests of the network traffic, a predetermined number of different user-agent strings associated with network requests of the network traffic, and network requests in a predetermined number of time periods;
monitor traffic information corresponding to the plurality of location characteristics until a threshold of traffic information is collected for each of the plurality of location characteristics;
determine a plurality of location content flags corresponding to the traffic information;
generate the location profile to deny incoming web traffic above a security threshold from reaching a client device, the location profile based on the plurality of location characteristics and the plurality of content flags; and
block the incoming web traffic from reaching the client device based on the location profile when the incoming web traffic corresponds to impermissible web traffic.

9. The system of claim 8, wherein to block the impermissible web traffic, the processing device is further to:
determine that the impermissible web traffic comprises a known location characteristic in the location profile;
determine a flag of the known location characteristic; and
determine that the flag indicates that a content of the known location characteristic is impermissible according to the location profile.

10. The system of claim 8, the processing device further to:
determine that permissible web traffic comprises a known location characteristic in the location profile;
determine a flag of the known location characteristic;
determine that the flag indicates that a content of the known location characteristic is permissible according to the location profile;
allow the permissible web traffic to reach the client device in response to determining that the flag is permissible.

11. The system of claim 8, wherein the threshold of network traffic corresponds to a predetermined a number of total network requests received.

12. The system of claim 8, wherein the threshold of traffic information corresponds to a predetermined a number of network requests comprising a specific location characteristic.

13. The system of claim 8, wherein each of the plurality of location characteristics comprises an identification of at least one of a: host, uniform resource locator (URL), method, query string parameter, body parameter, or cookie of the website or the application program interface (API) that the network traffic is associated with.

14. The system of claim 8, wherein the location profile identifies a plurality of location characteristics and corresponding allowable content.

15. A non-transitory computer-readable storage medium including instructions that, when executed by a processing device, cause the processing device to:
monitor web traffic until a threshold of network traffic is collected;
determine a plurality of location characteristics corresponding to the network traffic, wherein each of the plurality of location characteristics corresponds to a parameter or characteristic of a website or application program interface (API) that the network traffic is associated with, and wherein the threshold of network traffic corresponds to a predetermined number of different internet protocol addresses associated with network requests of the network traffic, a predetermined number of different user-agent strings associated with network requests of the network traffic, and network requests in a predetermined number of time periods;
monitor traffic information corresponding to the plurality of location characteristics until a threshold of traffic information is collected for each of the plurality of location characteristics;
determine a plurality of location content flags corresponding to the traffic information;
generate, by the processing device, a location profile to deny incoming web traffic above a security threshold from reaching a client device, the location profile based on the plurality of location characteristics and the plurality of content flags; and
block the incoming web traffic from reaching the client device based on the location profile when the incoming web traffic corresponds to impermissible web traffic.

16. The non-transitory computer-readable storage medium of claim 15, wherein to block the impermissible web traffic, the processing device is further to:
determine that the impermissible web traffic comprises a known location characteristic in the location profile;
determine a flag of the known location characteristic; and
determine that the flag indicates that a content of the known location characteristic is impermissible according to the location profile.

17. The non-transitory computer-readable storage medium of claim 15, the processing device further to:
determine that permissible web traffic comprises a known location characteristic in the location profile;
determine a flag of the known location characteristic;
determine that the flag indicates that a content of the known location characteristic is permissible according to the location profile;
allow the permissible web traffic to reach the client device in response to determining that the flag is permissible.

18. The non-transitory computer-readable storage medium of claim 15, wherein the threshold of network traffic corresponds to a predetermined a number of total network requests received.

19. The non-transitory computer-readable storage medium of claim 15, wherein each of the plurality of location characteristics comprises an identification of at least one of a: host, uniform resource locator (URL), method, query string parameter, body parameter, or cookie of the website or the application program interface (API) that the network traffic is associated with.

20. The non-transitory computer-readable storage medium of claim 15, wherein the location profile identifies a plurality of location characteristics and corresponding allowable content.

* * * * *